Mar. 13, 1923.

J. H. DEAN ET AL.
MACHINE FOR MAKING EXPANDED METAL.
FILED JAN. 23, 1923.

J. H. DEAN ET AL.
MACHINE FOR MAKING EXPANDED METAL.
FILED JAN. 23, 1923.

Inventors
James H. Dean
Torris H. Alfreds
By Clarence E. Mehlhope Atty.

Mar. 13, 1923.

J. H. DEAN ET AL.
MACHINE FOR MAKING EXPANDED METAL.
FILED JAN. 23, 1923.

Inventors
James H. Dean
Torres H. Alfreds
by Clarence E. Mehlhope
Atty.

Patented Mar. 13, 1923.

1,448,109

UNITED STATES PATENT OFFICE.

JAMES H. DEAN, OF LUDINGTON, MICHIGAN, AND TORRIS H. ALFREDS, OF PARK RIDGE, ILLINOIS, ASSIGNORS TO NORTHWESTERN EXPANDED METAL COMPANY, OF CHICAGO, ILLINOIS, A CORPORATION OF ILLINOIS.

MACHINE FOR MAKING EXPANDED METAL.

Application filed January 23, 1923. Serial No. 614,472.

*To all whom it may concern:*

Be it known that we, JAMES H. DEAN and TORRIS H. ALFREDS, citizens of the United States, and residents of Ludington, Michigan, and Park Ridge, Illinois, respectively, have invented certain new and useful Improvements in Machines for Making Expanded Metal; and we do hereby declare that the following is a full, clear, and exact description thereof, reference being had to the accompanying drawings, and to the letters of reference marked thereon, which form a part of this specification.

This invention relates to improvements in machines for making expanded metal and consists of the matters hereinafter described and more particularly pointed out in the appended claims.

One of the objects of the present invention is to provide a machine which will operate to expand certain predetermined portions of a metallic sheet, leaving between said expanded portions, unexpanded portions of a width greater than that of one of the strands in the expanded portion, with the said expanded portions and the said unexpanded portions arranged in parallel, alternate relation in the finished sheet.

This object of the invention together with the many advantages thereof will more fully appear as we proceed with our specification.

In general our improved machine, includes upper and lower knife bars having a relative vertical movement. Associated therewith are primary and secondary means for feeding the sheet toward and between said knife bars, the feeding means having a lateral movement with respect to the knife bars. The primary feeding means feeds the sheet toward and between the knife bars a predetermined number of times, in short successive, step by step movements, each of which is equal to the width of the strand between adjacent rows of mesh, until a predetermined number of such rows of mesh has been formed. The secondary feeding means then operates automatically to feed the sheet forward and between the knife bars, a distance greater than the width of one of the strands between the rows of mesh in the expanded portion, after which the primary feeding means again operates to feed the sheet the predetermined number of times, in short, step by step movements, as before described, the said two feeding means operating in proper timed relation until the finished or expanded sheet is discharged from the machine.

Referring now in detail to that embodiment of our invention illustrated in the accompanying drawings, 25 indicates the frame of our improved machine, which is suitably secured upon a masonry foundation arranged to extend above the floor of the building in which the machine is located. Said frame includes upright end standards 26, 26, which are spaced a suitable distance apart but are rigidly connected together by top and bottom transversely extending frame members 27 and 28 respectively.

The bottom connecting frame member or bed plate 28 is made in the form of a horizontally disposed elongated channel, having a front web 29 arranged flush with the front face of the end standards 26, and top and bottom rearwardly extending flanges 30 and 31, respectively. Said connecting frame member includes end walls 32, which engage against and are bolted to the end standards 26, 26. On the top of said frame member 28, at the front thereof, is provided a longitudinal shoulder 33 extending the full width of the frame member. On the front face of the web 29 a short distance below said shoulder is a longitudinally extending rib 34. The front face of the shoulder 33 and the web 29, above the rib 34 is faced off to receive a stationary knife bar 35 preferably made in sections, said knife bar sections having longitudinally spaced slots 36 therein to receive the bolts 37 which extend through said slots and are threaded into the shoulder to secure the knife bar in place. Threaded through the rib 34 on the front face of the frame member 28, are vertically disposed set screws 38 which engage the bottom edge of the knife bar sections. Said screws provide the necessary adjustment for the knife bar sections so that the top edges of said sections may all be aligned in the same horizontal plane, and assist in holding said sections in their proper positions.

The top connecting frame member 27 is also made in the form of a horizontally disposed channel, having a front web 40 and top and bottom, rearwardly extending flanges 41 and 42 respectively. Said channel member includes end walls 43 which engage against and are bolted to the end standards 26, 26. The bottom flange 42 of said connecting member 27 is spaced vertically above the top flange of the other channel connecting member 28, to provide a space or compartment in which the sheet feeding mechanism is located as will hereinafter appear, the front web 40 of said member 27 being arranged in a vertical plane spaced rearwardly from that of the front web 29 of the member 28.

Figure 3:
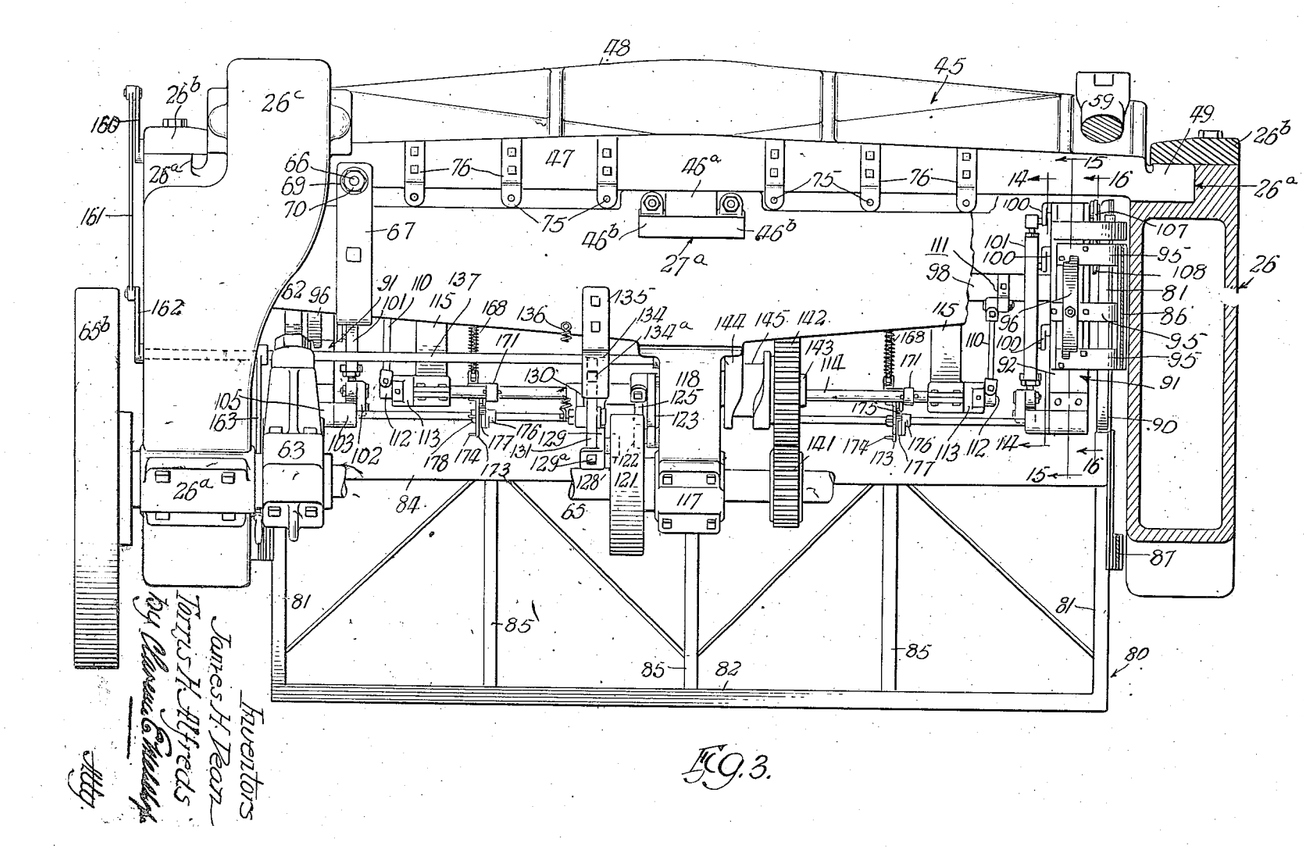
Fig. 3 is a top plan view of a machine embodying our invention, a part of which is shown as broken away to more clearly illustrate the same.

45 indicates a knife head which is mounted at its ends and at its middle, for a vertical reciprocating movement with respect to the end standards 26, 26 and the top channel connecting member 27. Said knife head includes an upright rear web 46 and top and bottom forwardly extending flanges 47 and 48 respectively, the said web and flanges being braced by suitable integral connecting flanges so that said head will amply withstand the strains imposed upon it. The upright web of the knife head has end extensions 49 (only one of which is shown in Fig. 3) which have sliding bearing in faced off recesses 26$^a$ in the front face of said end standards 26, suitable face plates 26$^b$ being bolted to said end standards to hold said knife head extensions in position. Bolted to the rear face of the web 46 of the knife head, mid way between its ends is a vertically disposed block 46$^a$. Said block has lateral extensions 46$^b$ which have sliding bearing in a complementally shaped, vertically disposed groove 27$^a$ formed in the front face of the channel member 27. It is apparent from the foregoing description that the knife head 45, while mounted for vertical reciprocating movement in the end standards 26, and member 27, cannot shift horizontally.

Seated in a suitable recess in the bottom surface of the knife head flange 48 at its rear edge, is a longitudinally extending flat bar 50 which is secured to the knife head in any suitable manner.

Figure 4:
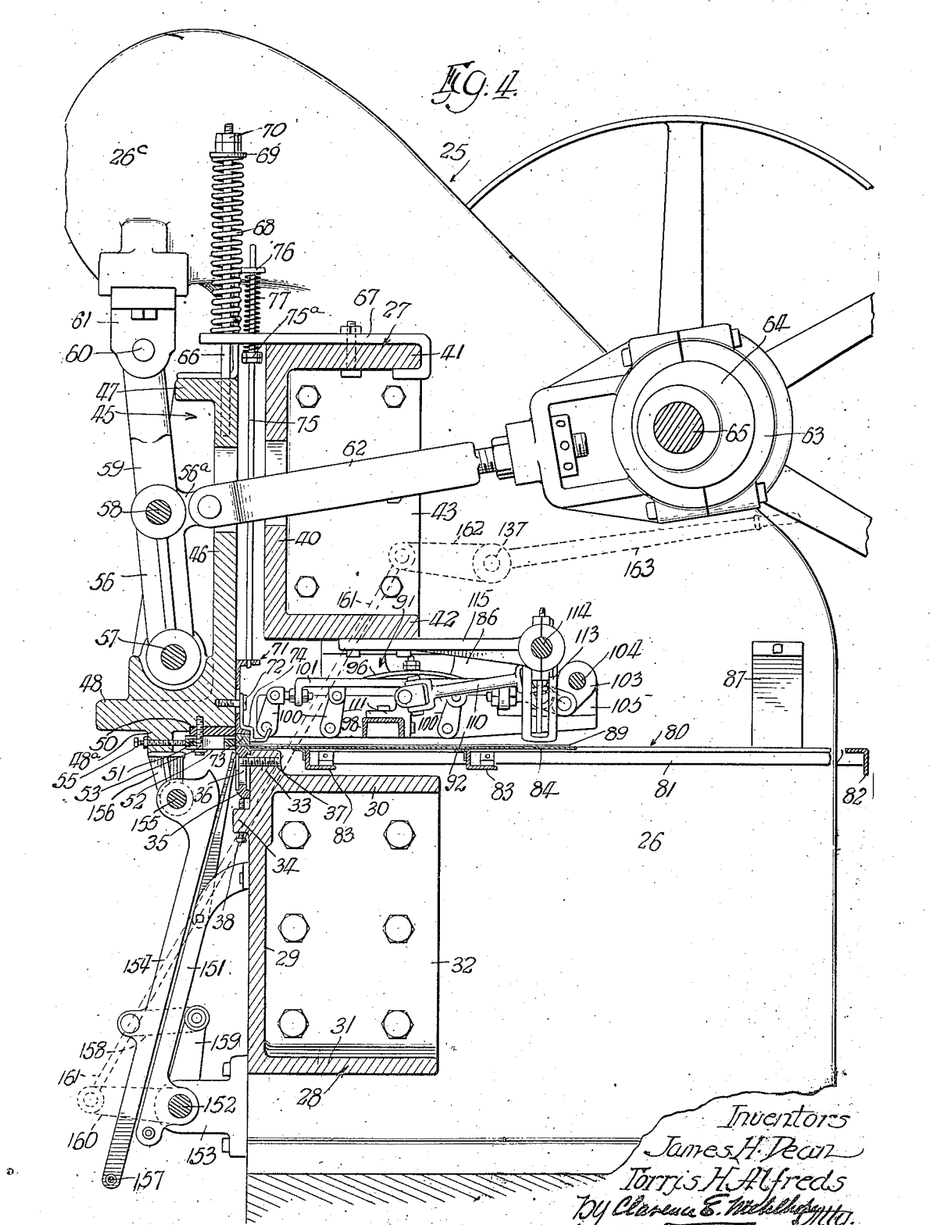
Fig. 4 is a vertical sectional view on an enlarged scale, taken through one end of the machine as indicated by the line 4—4 of Fig. 2.
Figures 12, 13, 14, 15, 16, 17, 18, 19, 20:
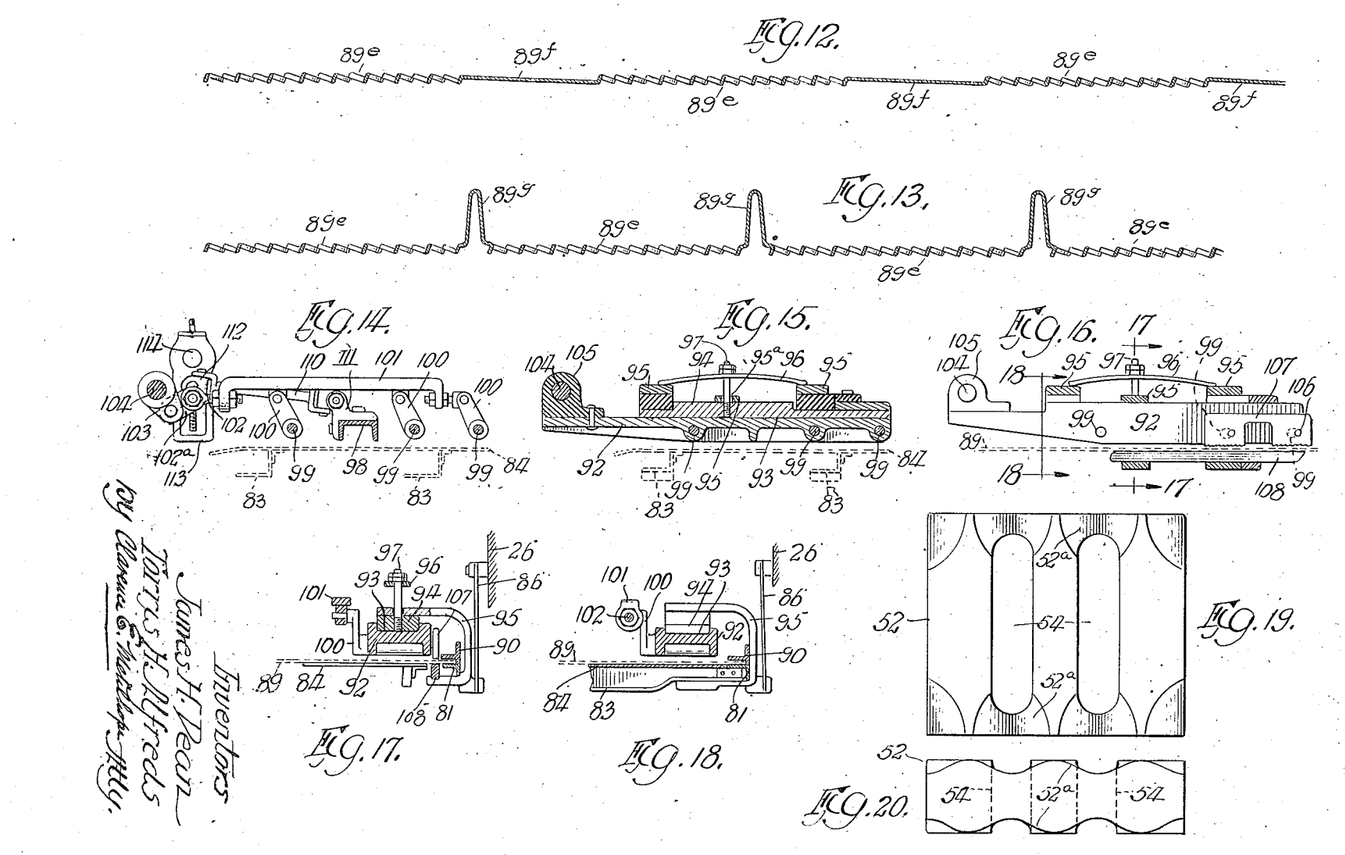
Fig. 12 is a transverse sectional view through an expanded sheet made in accordance with our invention, the plane of the section being indicated by the line 12—12 of Fig. 10.
Fig. 13 is another transverse sectional view through the sheet, showing the same after passing through a "ribbing" machine to upset the unexpanded portions thereof, to form ribs which project from one surface of the sheet.
Figs. 14, 15 and 16 are transverse vertical, detail sectional views as taken on the lines 14—14, 15—15, and 16—16, respectively, of Fig. 3.
Figs. 17 and 18 are detail sectional views as taken on the lines 17—17 and 18—18, respectively, of Fig. 16.
Fig. 19 is a top plan view of one of a plurality of knife blocks embodied in the machine.
Fig. 20 is an end view of said knife block.

Associated with said bar, is a knife bar 51 made of a plurality of knife sections 52, see Figs. 4, 19 and 20 respectively. Each knife section consists of a flat rectangular block, the ends of which are formed to provide top and bottom undulating surfaces 52$^a$ which conform in outline to the diamond shaped, open mesh of the finished expanded sheet. The knife sections are arranged side by side, in face to face engagement with the bar 50 and are bolted thereto by bolts 53 which extend through slots 54 in said sections and through said bar 50 into the bottom flange 48 of the knife head. The rear ends of the knife sections are arranged in the plane of the front face of the stationary knife bar 35 before mentioned, and to assist in making the proper adjustment of said sections, there are provided, suitable adjustment bolts 55 which are threaded through a longitudinal rib 48$^a$ on the bottom web 48 of the knife head and engage the front ends of said knife sections. By means of the bolt and slot connections 53 and 54 together with the bolts 55, the knife sections may be accurately adjusted and then locked securely in position.

Figure 1:
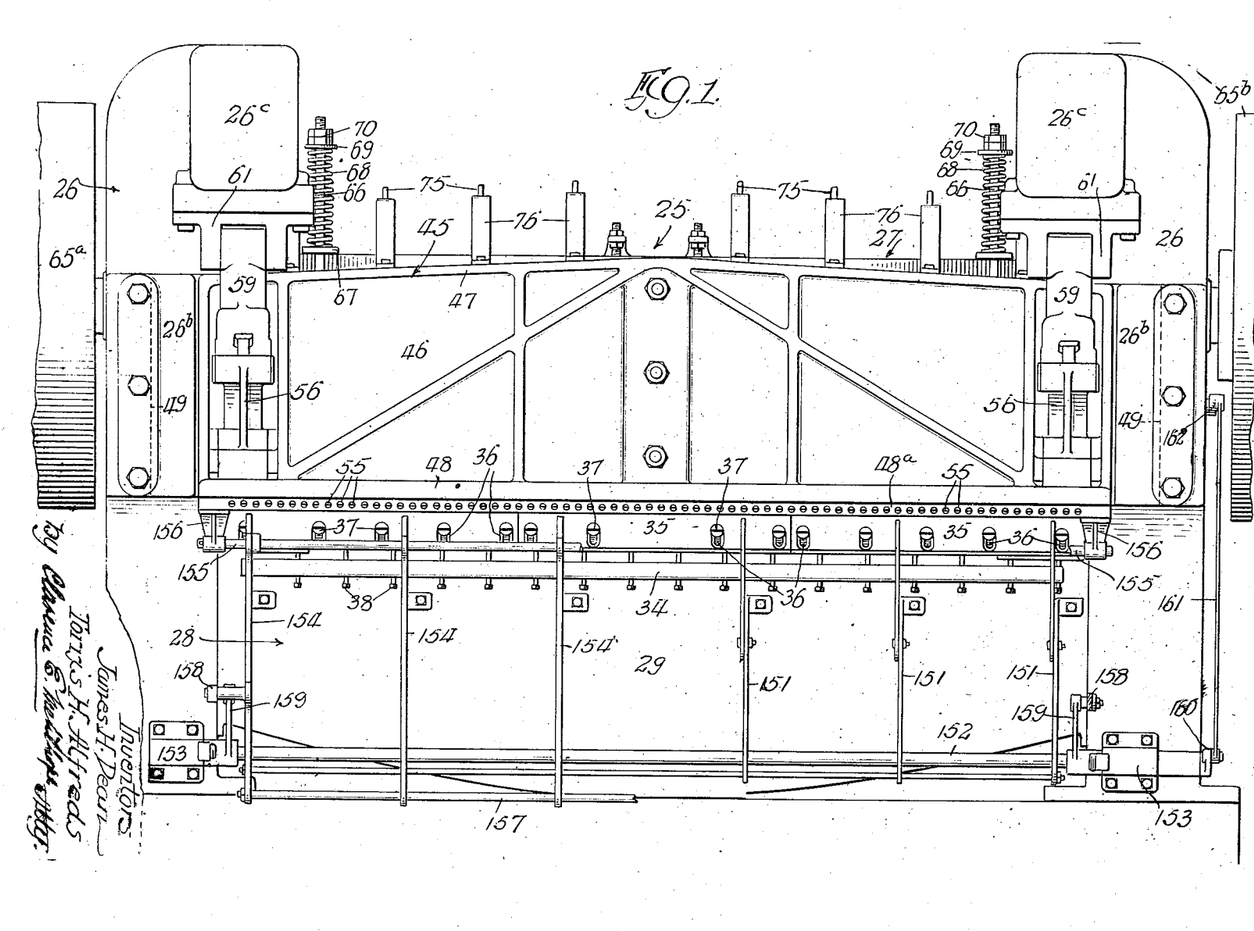
Fig. 1 is a view in front elevation of a machine for making expanded metal, embodying our invention.

Vertical reciprocating movement is imparted to the knife head 45 as follows: 56, 56 indicate links which are pivotally connected at their bottom ends to the knife head by means of short longitudinally extending, horizontally disposed pins 57 fixed in suitable ears near the ends of said knife head. The top ends of said links are connected by pins 58 with the bottom ends of coacting links 59, the top ends of which swing upon pins 60 journalled in bearing blocks 61 that depend from and are bolted to the overhanging top ends 26ᶜ of the end standards. Said top ends of said end standards are offset inwardly from the plane of the main body part of said standards, as shown in Figs. 1 and 3 of the drawings, so that the links 56 and 59 which form a toggle between the knife head and said top ends are spaced inwardly from the ends of the knife head. Each link 56 has a short rearward extension 56ᵃ (see Fig. 4) at its top end and connected to said extension is the front end of a pitman rod 62, the rear end of which is formed to provide an eccentric strap 63. The straps 63 of said pitman rods surround eccentric discs 64, fixed to a horizontally extending, transversely arranged drive shaft 65 near its ends, which is journalled in suitable bearing boxes 26ᵈ mounted on the end standards 26. Fixed to the ends of the driven shaft beyond the end standards 26, are the drive pulley and the balance wheel 65ᵃ and 65ᵇ respectively. When the drive shaft 65 is rotating, it is apparent that the pitman rods 62 will actuate the toggle links 56 and 59 so as to impart, comparatively short, vertical, reciprocating movements to the knife head. In the web 40 of the channel shaped connecting member 27 and in the web 46 of the knife head are provided suitable openings through which the pitman rods 62 extend. To assist in the upward vertical movement of the knife head, there is provided the following construction: Secured in the web 46 of the knife head near its ends are relatively long, vertically disposed lag bolts 66 which slide through suitable holes in the front ends of forwardly extending arms or straps 67 secured to the top flange of the connecting channel member 27. Surrounding that part of each lag bolt 66 above the associated arm 67 is an expansion coiled spring 68 which engages at one end against said arm and at its other end against a washer 69 on the top end of said lag bolt. Nuts 70 are screwed on the top end of each lag bolt to provide the desired tension in said spring. In the downward movement of the knife head, the springs 68 are compressed and their expansive tendency assists in lifting the knife head in its upward movement.

Associated with the knife head is a yielding presser foot bar 71 which is adapted to hold the sheet to be expanded while the knife bar is cutting the slits therein and bending downward, the strands formed thereby in the usual manner. The presser foot bar is made in two sections, one arranged on each side of the plane of the block 46ᵃ on the rear face of the knife head. Each presser foot bar section consists of a horizontally disposed channel, with its web engaging against the rear face of the knife head web 46 at its bottom, and with its flanges directly rearwardly. Said presser foot channels are secured to the knife head by means of bolts 72 which extend through suitable vertical slots in the web of said channels and into said knife head in a manner permitting a limited relative movement between said knife head and presser foot bar members in the manner well known. Fixed to the bottom portion of said presser foot channels are sectional blocks and guide flanges 73 and 74 respectively. The sectional blocks engage the sheet which is being operated upon and the flanges 74 assist in guiding a new sheet into place when said sheet is first inserted in position in the machine to be operated upon. Associated with the channel sections of the presser foot are transversely spaced, vertical rods or bolts 75 which extend upwardly through the space between the channel like connecting member 27 and the knife head 45, the top ends of said rods having sliding bearing in Z shaped brackets 76 fixed to the top flange 47 of the knife head. Threaded upon the upper ends of said rods or bolts are nuts 75ᵃ and surrounding said upper ends of said rods between said nuts and said bracket arms are expansion coiled springs 77 which normally urge said rods and consequently the presser foot downwardly. In the downward movement of the knife head, the presser foot bar will engage the sheet before the knife bar 51 reaches the same, so that the sheet is securely held during the slitting of the sheet and the stretching and bending of the strands produced by the knife bar. In the upward movement of the knife head the presser foot will be carried upwardly therewith away from the sheet so that the same may be fed forwardly the proper distance as will later appear.

80 indicates a table or support for the sheet to be operated upon. Said table is in the form of a rectangular, open frame arranged in a horizontal plane a short distance above that of the top flange 30 of the bottom channel like connecting member 28. Said table or support includes side bars 81 and a rear bar 82,—the forward ends of the side bars being connected together by angle bars 83, 83. Mounted on the table and fixed to the side bars 81 and front angle bars 83 is a plate 84, the front marginal part of which overhangs the shoulder 33 on the channel like connecting member 28, terminates near the rear edge of the stationary knife bar 34 on said connecting member. The table is braced against distortion by bars 85 (see Fig. 3) which connect the rearmost angle bar 83 with the rear bar 82. The table 80 is mounted for a short, lateral vibrating movement between the standards 26 by means of front and rear, vertically arranged flexible plates 86, 87 which are connected at their bottom ends to the side bars 81 of the frame and are connected at their top ends to but are spaced a short distance inwardly from, said end standards. The plate 84 is of a depth less than that of the table or frame 80 and is adapted to provide the support for the metallic sheet 89 which is being operated upon, the sheet being placed upon the table with its longer sides extending transversely of the machine. To prevent the sheet from shifting laterally or twisting while on said table, there are provided a short distance above the end bars 81, 81, guide bars 90, 90 (see Figs. 3 and 17) which overhang the narrower ends of the sheet, as shown in Figs. 17 and 18.

Located a short distance above the table 80, at each side thereof, and arranged in the space between the channel like connecting members 27 and 28, is a sheet feeding mechanism indicated as a whole in Fig. 3 by the reference number 91, which is adapted to feed the sheet forwardly toward and between the coacting knife bars, a distance equal to the width of the strands between the rows of mesh of the finished expanded sheet. As the feed mechanism at each side of the table is the same, a description of one will suffice for both. Each sheet feeding mechanism includes an elongated block 92 (see Figs. 3 and 15) which is arranged parallel with but spaced inwardly from the associated end standard 26. In the top surface of the elongated block 92 is a longitudinal groove 93 adapted to receive a shoe or guide block 94. The guide block 94 is made rigid with and is supported from the adjacent side bar 81 of the table by means of a plurality of U shaped yokes 95, 95, one end of each of which is secured to the guide blocks and the other end of which is secured to said side bar 81, and in one instance to one of the bars 83 connecting the side bars together. The blocks 92 and 94 which are capable of a short, limited, relative longitudinal movement, are held in the proper engagement by means of an arched, leaf tension spring bar 96 which rests at its ends on the top ends of the two yokes 95, 95. A lag bolt 97 is threaded into the guide block 94 and extends through a short slot 95ª in the intermediate yoke arm 95, (see Fig. 15) and through the spring bar 96 at its middle, where said bolt is provided with nuts so that the proper tension may be imposed upon said spring. The longitudinal blocks 92, 92 at the sides of the table are connected together at points between their ends, by an inverted channel bar 98 through which a lateral shifting movement is imparted to the blocks 92 and through the yokes 95 to the table 80, as will later appear. The feed blocks 92, 92 are so positioned that their forward ends are arranged adjacent the plane of the presser foot bar 71 and the flanges 74 both of which are cut away to provide room for the forward ends of said blocks, as is apparent from Fig. 4.

Associated with the elongated block, is a sheet gripping means, that operates to grip the sheet 89, after which a forward movement is imparted to the block 92 to feed said sheet forward a distance equal to the width of a strand between the open mesh of the finished sheet. After this feeding movement, the gripping means is released and the blocks 92 are retracted to their normal position. Extending transversely through the feed block 92 below the groove 93, is a plurality of short, rock shafts 99, 99, (see Fig. 15). The inner end of each of said shafts, carries a crank arm 100—all of which are pivotally connected to a universal bar 101 spaced inwardly of and adjacent to the elongated block 92. The rear end of said bar carries an adjustable eye bolt 102 which is connected by a short link 102ª to an arm 103 fixed to a horizontally disposed, transversely extending rock shaft 104 which is journalled at its ends in suitable boxes 105 on the rear ends of said blocks 92. The outer ends of the two forward rock shafts 99 have eccentrically disposed pins 106, (see Fig. 16) which carry a duplex feed shoe 107, the bottom surface of which is formed to provide gripping teeth. Associated with the feed shoe 107 is a gripping bar 108 which is supported on the inner ends of the bottom arms of the yokes 95, the plate 84 of the table being cut away so that the top surface of the gripper bar will engage the bottom surface of the sheet 89 which is being operated upon. It is apparent that when the rock shaft 104 is actuated, a like movement is imparted to the short rock shafts 99, which through the eccentric pins 106 will actuate the feed shoe to alternately grip and release the sheet 89.

Forward and rearward short, reciprocating movement is imparted to the elongated blocks 92 by means of connecting rods 110, the inner or forward ends of which have a universal joint connection with pins carried by a brackets 111 fixed to the connecting bar 98 near said elongated blocks 92. The rear ends of said connecting rods have a similar universal joint connection with pin blocks 112 carried by a rock arms 113 fixed to the ends of a horizontally disposed, transverse rock-shaft 114, arranged in a plane above and forward of that of the rock shaft 104. Each pin block 112 is capable of a radial adjustment in the arm 113 with reference to the shaft 114 so that the throw of the pin can be carefully determined. The rock shaft 114 has bearing at its ends in bearing brackets 115 which are secured to the bottom flange 42 of the connecting member 27 and extend rearwardly therefrom. After the gripping shoes have gripped the sheet, the rock shaft 114 operates through the connecting rods 110 and channel 98 to impart a forward movement to the elongated blocks 92, the rock shaft 104, which is of a comparatively small diameter, flexing with the movement of the elongated block. The universal joint connection of the pitman 110 with its associated parts, permits the lateral shifting movement of the table without in any manner interfering with the imparting of the reciprocating movement to the blocks 92.

Figure 2:
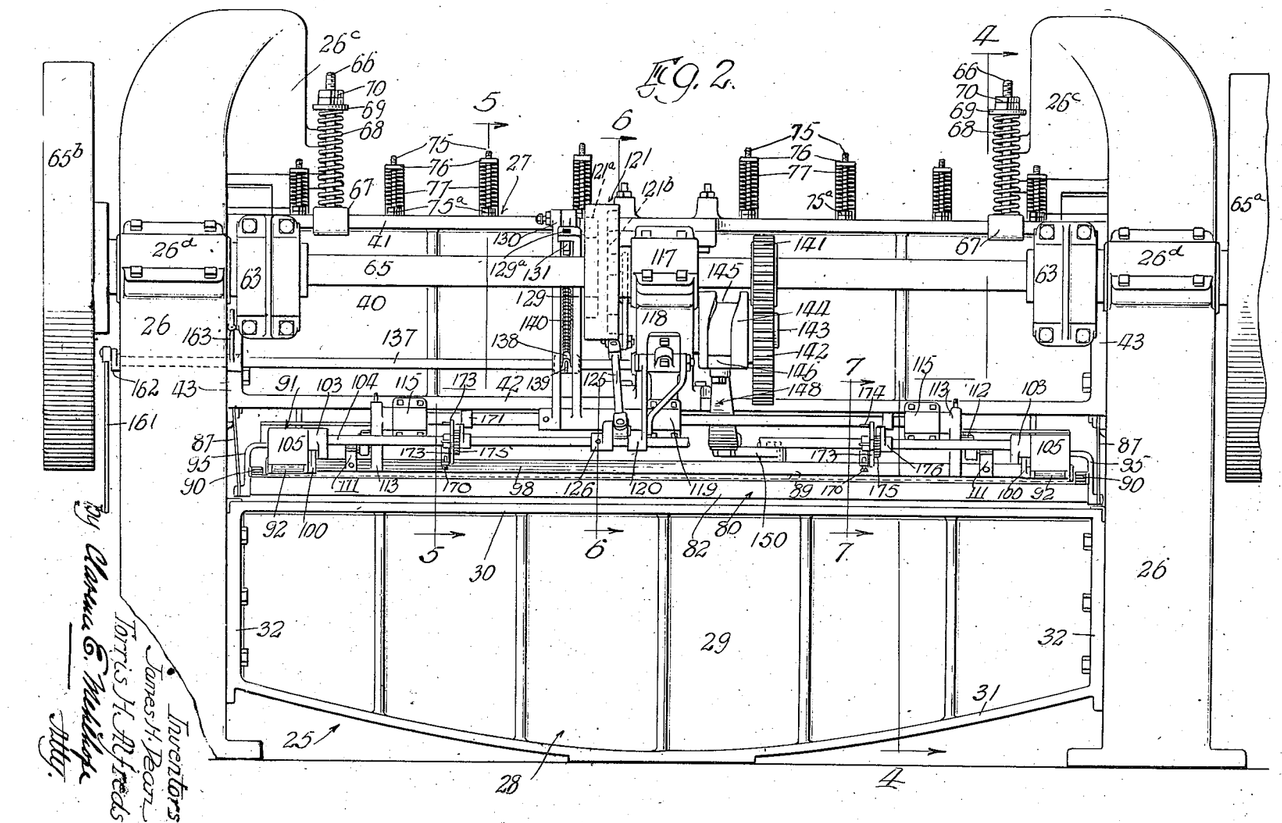
Fig. 2 is a view in rear elevation of the same.

Rocking movement is imparted to the shafts 104 and 114 from the main drive shaft 65 as follows:—The main drive shaft has bearing at its middle in a bearing box 117, (see Figs. 3 and 6) made integral with a bracket 118 which projects rearwardly from the top connecting member 27 at its middle. This bracket includes a second bearing box 119 in which the rock shaft 114 is journalled at its middle and forms the support for a hanging box 120, (see Fig. 2) in which the rock shaft 104 is journalled at its middle. Fixed to the main drive shaft, to one side of the bracket 118 (the left hand side as viewed in Figs. 2 and 3) is a cam disc 121 having cam grooves 121ª, 121ᵇ, (see Figs. 5 and 6) in its opposite faces. Associated with the cam groove 121ᵇ is a roller 122 carried by the short arm of a bell crank lever 123 which is pivoted at 124 to the bracket 118. The long arm of said bell crank lever has a universal joint connection with the top end of a pitman or connecting rod 125 the other or bottom end of which has a similar connection with an arm 126 fixed to the rock shaft 104 adjacent the bearing hanger 120. It is apparent that in the rotation of the drive shaft, a rocking movement is imparted to the shaft 104 through the cam groove 121ᵇ, bell crank lever 123 and arm 126.

Figure 5:
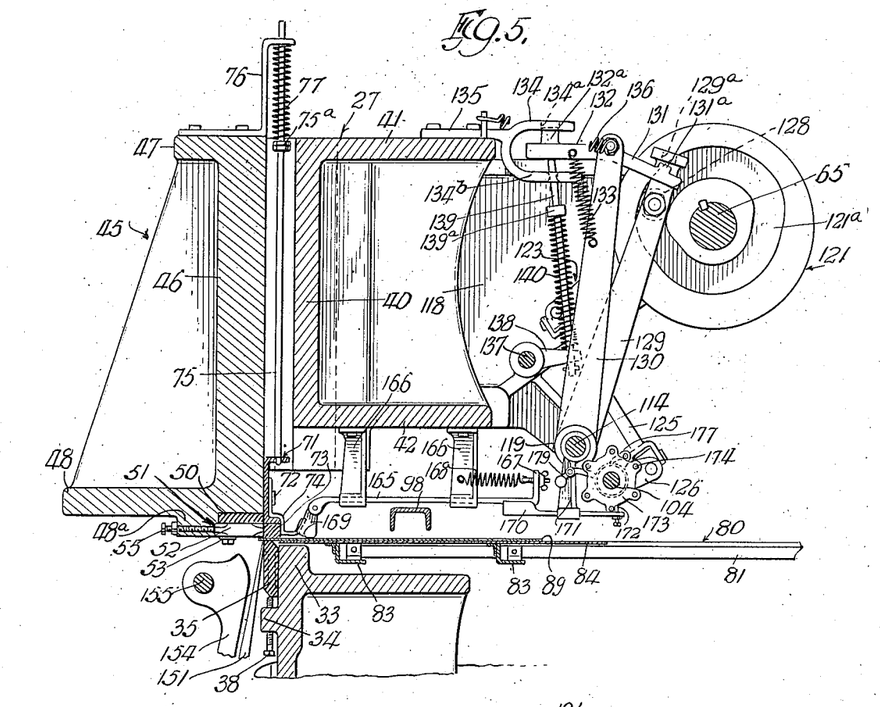
Fig. 5 is a detail vertical sectional view taken on the line 5—5 of Fig. 2.
Figure 6:
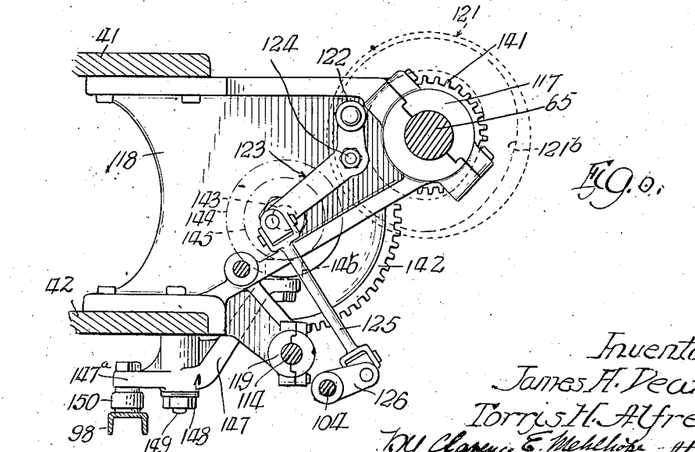
Fig. 6 is another detail vertical sectional view taken on the line 6—6 of Fig. 2.

Associated with the cam groove 121ª is a roller 128 journalled near a top end of the lever 129, which is loosely mounted on the rock shaft 114. Fixed to said rock shaft, adjacent the lever 129, is a second and similar lever 130, and pivoted to the top end of said lever is a rocking pawl which includes two arms 131, 132. A coiled spring 133 (see Fig. 5) connects the arm 132 with the lever 130 to hold the last mentioned arm downwardly. The arm 131 carries an upwardly extending lug 131ª adapted to engage in a hole 129ª in the top end of the lever 129 which is bent laterally to overhang the pawl arm 131. The pawl arm 132 has a similar lug 132ª adapted to engage in a hole 134ª in the upper tine 134 of a forked member 135 fixed to and extending rearwardly from the top flange 41 of the connecting member 27. A coiled spring 136 connects the top end of the lever 130 with the connecting member 27 and acts to yieldingly urge said top end toward said connecting member when the lever 130 is disconnected from the lever 129 as shown in Fig. 5, to hold the rock shaft 114 in one limit of its rocking position.

Means are provided for actuating the pawl arms 131 and 132 so as to connect and disconnect the levers 129 and 130, and such means are as follows:—137 indicates a horizontally disposed, transversely extending shaft arranged in a plane above and forward of the rock shaft 114. This shaft has bearing at one end (the right hand end as viewed in Figs. 2 and 3) in a boss provided therefor on the bracket 118 and extends through and beyond, but has bearing in the left hand standard 26 as viewed in said figures. Fixed to said shaft in a plane intermediate the levers 129 and 130 is a short horizontally extending arm 138. 139 indicates a vertically disposed rod which extends at its bottom end through said arm 138, and at its top end through the bottom tine 134ᵇ of the fork 135 and engages with the underside of the pawl arm 132. A collar 139ª is secured near the top end of said rod and surrounding the same between said collar and the arm 138 is an expansion coiled spring 140, which normally urges said rod against said pawl arm. The shaft 137 is intended to be rocked manually, as will later appear, and when it is so rocked to swing the arm 138 downwardly from the position shown in Fig. 5, it will, through a cross pin in the bottom end of the rod 139, move the same downward away from the pawl arm 132. The spring 133 will then swing the arm 132 downwardly and swing the other arm 131 upwardly, so that its lug 131ª will engage in the hole 129ª in the top end of the lever 129 and will lock the two levers 129 and 130 together. Thus, when the drive shaft 65 is rotating, the cam disc 121 will rock the lever 129 and this movement will be imparted to the rock shaft 114 by reason of the fact that the two levers 129 and 130 are locked together as before mentioned. This rocking movement of the shaft is translated into a short, reciprocating movement of the elongated feed bars 92 as before described to feed the sheet forwardly to the knife bars. When the parts are in the position shown in Fig. 5 wherein the levers 129 and 130 are disconnected, the cam 121 only acts to rock the lever 129 idly by reason of its being loose on the shaft 114 as before described.

Fixed on the drive shaft 65 on the right hand side of the plane of the bracket 118 and spaced a suitable distance therefrom, is a gear pinion 141 which meshes with a gear 142 journalled on a stud 143 projecting laterally from the bracket 118. Made rigid with said gear 142 and arranged between the same and the bracket 118 is a cam disc 144 having a peripheral cam groove 145. 146 indicates a roller engaged in said cam groove which roller is carried on the top end of a long arm 147 of a bell crank rocking lever 148, (see Fig. 6) which is pivoted at 149 to the bottom flange 42 of the connecting member 27, to rock about a vertical axis. The short horizontal arm 147$^a$ of said lever projects forwardly and overhangs the channel bar 98 which connects the elongated blocks 92 of the sheet feeding means together. Said short arm 147$^a$ is pivotally connected to the channel 98 by a link 150. It is apparent that when the cam 144 is rotating, it will, through the bell crank 148 and link 150 impart a lateral vibrating or reciprocating movement to the channel member 98. By reason of the fact that the elongated blocks 92 are connected to the table side bars 81, through the yokes 95, a like movement is imparted to the table 80 and sheet 89, the table being connected to the standard 26 by the spring plates 86, 87 to support and accommodate the table in such movement.

Figure 11:
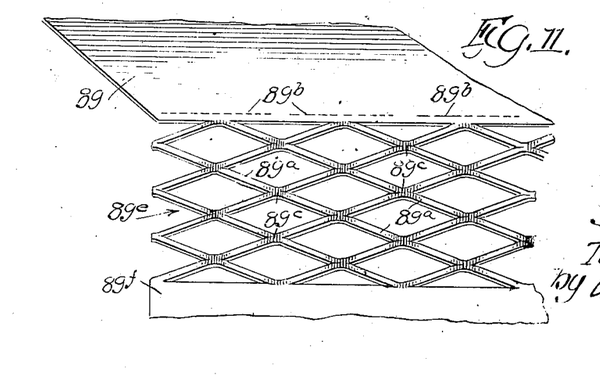
Fig. 11 is a perspective view on an enlarged scale of a fragment of the sheet made in accordance with our invention and will be more particularly referred to later.

It is apparent from the foregoing that the sheet 89 is fed forward, step by step, between the knife bars 35 and 51, a distance equal to the width of a strand 89$^a$ (see Fig. 11). As the upper or movable knife bar 51 descends and engages that margin of the sheet projecting over the lower or stationary knife bar 35, it will first cut a plurality of transversely spaced slits 89$^b$ in said sheet margin. Further downward movement of the knife bar 51 will bend the slit portions downward and will stretch them so that they conform to the engaging faces 52$^a$ of the knife sections 52. The said knife bar now ascends and the table 80 and sheet 89 are shifted laterally so that the next time the knife descends it will cut the slits 89$^b$ in the planes of the bonds 89$^c$ connecting the associated strands together. Thus, the expanded parts 89$^e$ of the finished sheet, are formed. During this movement of the table and sheet, the feed shoes 107 engage and grip the sheet, after which the elongated blocks 92 move forwardly to feed the sheet between the knives, a distance equal to the width of a strand 89$^a$. The bend is imparted to the slit and severed portions or strands of the sheet in a direction at right angles to the plane of the remaining portion of the sheet and thus no contraction of the sheet occurs, as the expansion is obtained by the bending and stretching of the several strands.

The expanded portion of the sheet beyond the knife bar 35 follows down a plurality of guide arms 151 which are spaced transversely apart at the front of the machine, the said arms being inclined downwardly and outwardly from the stationary knife bar 35. The bottom ends of said guide arms have bearing on a horizontally disposed, transverse rock shaft 152 which is journalled at its ends in bearing boxes 153 projecting forwardly from the bottom ends of the standards 26. The said guide arms are secured between their ends to the front face of the web 29 of the connecting member 28. Associated with said guide arms is an open frame which is pivoted to and depends from the knife head 45 and reciprocates in the plane of the guide arms 151 to assist in feeding the expanded portion of the sheet downwardly against said guide arms. The said open frame comprises a plurality of vertically disposed bars 154 which are arranged in the planes of the guide arms. Said bars are secured at their top ends to a transversely extending shaft 155 which is journalled at its ends in hangers 156 depending from the ends of the knife head 45. The bottom ends of said bars are connected together by a rod 157. The endmost bars 154 are connected by links 158 to the free ends of arms 159 secured to the ends of the shaft 152. When the operator desires to withdraw a finished, expanded sheet from the machine, he grasps the rod 157 and swings the frame bars 154 outwardly about the shaft 155 as an axis. This movement will, through the links 158 and arms 159, rock the shaft 152. Secured to one end of the shaft 152 beyond the bearing box 153 (the right hand end as viewed in Fig. 1) is another arm 160, shown in dotted lines in Fig. 4. The arm 160 is connected by a link 161, arranged in a plane between the end standard 26 and balance wheel 65$^b$, to a similar arm 162 secured to that end of the shaft 137 before mentioned, which projects beyond the standard 26, as before described. Thus, when the shaft 152 is rocked in this manner, a similar movement is imparted to the shaft 137 which through the arm 138 and rod 139 will disengage the pawl lever 131 from the arm 129 so that the rock shaft 114 which operates to feed the sheet forwardly is disconnected from the main drive shaft. This, however, has no effect upon the means for laterally vibrating the feed table 80, so consequently the expanded part of the sheet overhanging the bottom stationary knife bar is severed from the remainder of the sheet in the movement thereof. The forward feed of the sheet may also be controlled by the operator, who places the sheet 89 upon the table 80 and to this end there is provided a lever 163 which is fixed to the shaft 137 just inside of one of the standards 26. After a new sheet 89 has been inserted in place, the shaft 137 is rocked to throw the pawl lever 131 into locked engagement with the arm 129 after which the operation goes on as before described.

In connection with the mechanism for feeding the sheet forward toward and between the knife bars, as before described, which constitutes the main or primary feeding means, we provide another or secondary sheet feeding means which is adapted, after a predetermined number of operations of the primary feeding means, to feed the sheet toward and between the knife bars, a distance greater than the width of one of the strands 89$^a$ of the expanded portion 89 of the finished sheet, after which the primary feeding means again actuates to feed the sheet, so that in the finished, expanded sheet there appears alternating bands or strips of expanded and unexpanded sheet portions 89$^e$ and 89$^f$. After the finished sheet has been removed from the machine, the said sheet is passed through a "ribbing" machine which acts upon the unexpanded bands or strips to upset them into spaced ribs which extend longitudinally of the sheet.

The secondary sheet feeding means is so constructed in this case and is so correlated with respect to the primary feeding means, that it may be thrown out of operation so that the machine may be used when so desired to expand the entire sheet into open mesh.

Figure 7:
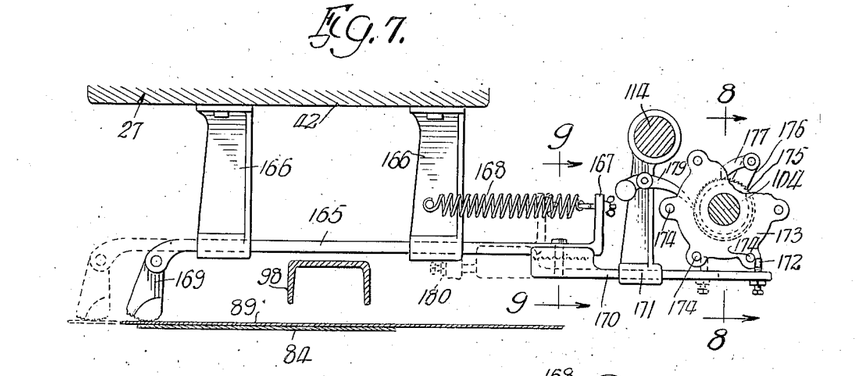
Fig. 7 is a detail vertical sectional view on an enlarged scale as taken on the line 7—7 of Fig. 2.

The secondary feeding means is constructed as follows:—Arranged in a horizontal plane, extending parallel with the end standards and spaced an equal distance on each side of the plane of the intermediate bracket 118 are feed bars 165, 165 (see Figs. 3 and 7). As the mechanism associated with each feed bar is the same, a description of one will suffice for both. Each bar has a sliding non-rotative bearing in spaced brackets 166, 166, which depend from the bottom flange 42 of the channel shaped member 27, connecting the end standards together. Said brackets support said bar in a plane above that of the channel 98 before mentioned and the rear end of said bar is bent to provide an upstanding arm 167. A coiled expansion spring 168 connects said arm to the rearmost bracket 166. To the forward end of said bar is hinged a gripper foot 169 which is weighted to hang in a predetermined position.

Adjustably connected to the rear end of said bar is an extension bar 170 adapted to extend beneath the rock shaft 104. Said extension has sliding bearing in a hanger 171 which depends from the rock shaft and at the rear end of said extension is provided a vertically disposed pin 172, which may be adjusted to determine the height of that part extending above the end of said extension. Loose on the rock shaft 104 is a disc 173 carrying a plurality of laterally extending pins 174 adapted to overhang the plane of the extension 170. On that side of the disc opposite the pins 174, and made integral with the disc, is a hub having ratchet teeth 175. Fixed to the shaft 104 adjacent the hub is a crank arm 176 carrying a pawl 177 adapted to engage with the ratchet teeth 175, and on the other side of the disc is a collar 178, the collar and crank arm preventing endwise movement of the disc. Carried on the hanger 171 is a second pawl 179 which engages the ratchet teeth and prevents backward movement of the disc 173.

As the shaft 104 is rocked in the step by step forward feed of the sheet 89, the disc 173 through the pawl 177 is rotated step by step. As the pins 174 on the disc 173 overhang the extension 170 of the bar 165, one of said pins 174 will engage the pin 172 on said extension and move the bar 165 rearwardly step by step, against the action of the spring 168 which is being placed under tension. After a predetermined number of rocking movements of the shaft 104, the active pin 174 will have moved the bar 165 rearwardly a distance greater than that of one of the strands 89$^a$ when said pin will slip off or pass the pin 172 which is then released, the power stored up in the spring when being placed under tension acting to impart a quick forward movement to the bar 165. The feed shoe 169 in said movement will act to grip the sheet 89 and feed the sheet forwardly the desired distance the next succeeding pin 174 being in the position, as shown in Fig. 7, to again move said bar rearwardly, as before described. A stop 180 (see dotted lines in Fig. 7) may be provided to limit the forward movement of the bar 165.

Figures 8, 9, 10:
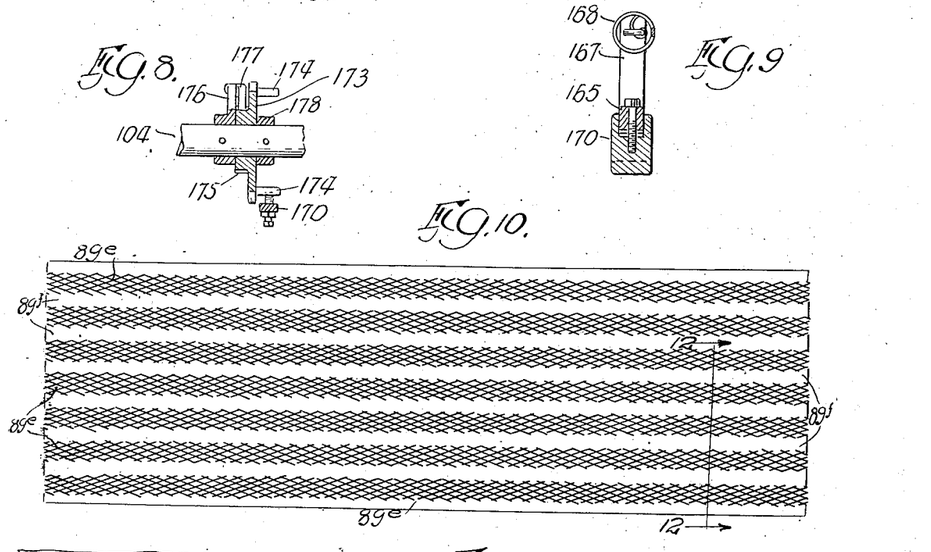
Figs. 8 and 9 are detail vertical sectional views as taken on the lines 8—8 and 9—9 respectively, of Fig. 7.
Fig. 10 is a plan view of a sheet of expanded metal as made in accordance with our invention.

In Fig. 10 is shown the finished expanded sheet with the expanded portions 89$^e$ alternating with the unexpanded portions 89$^f$, said arrangement being illustrated more in detail in the sectional view shown in Fig. 12. The sheet is then passed through a "ribbing" machine having suitable rolls which act upon the unexpanded portions or strips thereof, to upset the same into ribs 89$^g$, (see Fig. 13) the sheet now being ready for use for its intended purpose.

Should it be so desired, the pawl 177 may be thrown out of engagement with the ratchet 175, so as to be inoperative. Thus the secondary feed of the sheet is cut off from the other parts of the machine which will then act to expand the entire sheet.

The operation of the machine, and the advantages thereof is apparent from the foregoing description.

While in describing our invention we have referred to certain details of mechanical construction and arrangement of parts, we do not wish to be limited thereto except as may be pointed out in the appended claims.

We claim as our invention:

1. In a machine of the kind described for expanding sheet metal, in combination with the means for simultaneously slitting, stretching and expanding, said means acting in each operation throughout the length of the sheet, and the means for feeding the sheet step by step towards said slitting, stretching and expanding means, devices operating at predetermined intervals for increasing the width of one step of the feed, whereby alternate predetermined widths of bands of expanded and of unexpanded metal extending the length of the sheet are produced in succession.

2. In a machine of the kind described, the combination of coacting knife bars, having a relative vertical movement, means for feeding a sheet toward and between said knife bars, one of said knife bars and said last mentioned means having a relative lateral movement, and means acting at predetermined intervals in the feeding movement of said sheet for feeding the same forward between said knife bars, a distance greater than the width of one of the strands of the expanded portion thereof.

3. In a machine of the kind described, the combination of a stationary, lower knife bar, an upper knife bar capable of a vertical movement toward and away from said stationary lower knife bar, means for feeding a sheet toward and between said knife bars, said upper knife bar and said last mentioned means having a relative lateral movement, and means acting at predetermined intervals in the feeding movement of said sheet for feeding the same forward between said knife bars, a distance greater than the width of one of the strands of the expanded portion thereof.

4. In a machine of the kind described, the combination of coacting knife bars, having a relative vertical movement, means for feeding a sheet toward and between said knife bars, one of said knife bars and said last mentioned means having a relative lateral movement, and means acting on the unexpanded portion of said sheet and at predetermined intervals in the feeding movement thereof, for feeding said sheet forward between said knife bars, a greater distance than the width of one of the strands of the expanded portion of said sheet.

5. In a machine of the kind described, the combination of coacting knife bars, having a relative vertical movement, means for feeding a sheet toward and between said knife bars step by step, a distance equal to the width of one of the strands of the expanded portion of said sheet, one of said knife bars and said last mentioned means having a relative lateral movement, and means acting after a predetermined number of step by step feeding movements of said sheet has been accomplished, for feeding said sheet forward between said knife bars, a distance greater than one of said step by step feeding movements of said sheet.

6. In a machine of the kind described, the combination of coacting knife bars, having a relative vertical movement, means for feeding a sheet toward and between said knife bars step by step, a distance equal to the width of one of the strands of the expanded portion of said sheet, one of said knife bars and said last mentioned means having a relative lateral movement, and means acting after a predetermined number of step by step feeding movements of said sheet has been accomplished, for feeding said sheet forward a greater predetermined distance and at a greater speed than that of one of said step by step feeding movements of said sheet.

7. In a machine of the kind described, the combination of coacting knife bars, having a relative vertical movement, primary means for feeding a sheet toward and between said knife bars, in comparatively short step by step movements, and a secondary means for feeding the sheet toward and between the knife bars at predetermined intervals, a distance greater than that of one of said step by step feeding movements of said primary means, said secondary feeding means automatically coming into operation after a predetermined number of step by step feeding movements by said primary means, one of said feeding means having a relative lateral movement with respect to one of said knife bars.

8. In a machine of the kind described, the combination of coacting knife bars, having a relative vertical movement, primary means for feeding a sheet toward and between said knife bars, in comparatively short step by step movements, and a secondary means for feeding the sheet toward and between the knife bars, a distance greater than one of said step by step feeding movements of said primary means, devices included in said secondary feeding means and actuated by said primary feeding means for storing up power for actuating said secondary feeding means, said power storing devices being automatically released from said primary feeding means after a predetermined number of step by step feeding movements of said primary feeding means, to actuate said secondary feeding means, there being a relative lateral movement between said primary feeding means and one of said knife bars.

9. In a machine of the kind described, the combination of coacting knife bars, having a relative vertical movement, primary means for feeding a sheet toward and between said knife bars in comparatively short step by step movements, said primary feeding means being capable of a lateral movement with respect to one of said knife bars, a secondary means for feeding the sheet toward and between the knife bars at predetermined intervals, a distance greater than that of one of said step by step feeding movements of said primary means, said secondary feeding means being dependent for its operation on said primary feeding means, and means for disconnecting the secondary feeding means from the primary feeding means, so that the secondary feeding means is rendered inoperative without affecting the operation of the primary feeding means.

10. In a machine of the kind described for expanding sheet metal, in combination with means for simultaneously slitting, stretching and expanding, said means acting in each operation throughout the length of the sheet, means for feeding the sheet step by step towards said slitting, stretching and expanding means, for a predetermined number of operations of said last named means, and means for periodically feeding a wider strip of predetermined width whereby alternate bands of expanded and of unexpanded metal extending the length of the sheet are produced in succession.

11. In a machine of the kind described for expanding sheet metal, in combination with means for simultaneously slitting, stretching and expanding, said means acting in each operation throughout the length of the sheet, devices for feeding said sheet step by step towards said slitting, stretching and expanding means until a predetermined width of sheet has been expanded, and means for feeding the sheet for predetermined greater widths than the width of the normal feed, at predetermined intervals in the operation of the slitting, stretching and expanding means, whereby alternate bands of expanded and of unexpanded metal extending the length of the sheet are produced in succession.

12. In a machine of the kind described, for expanding sheet metal, in combination with means for simultaneously slitting, stretching and expanding, said means acting in each operation throughout the length of the sheet, devices for feeding said sheet step by step towards said slitting, stretching and expanding means until a predetermined width of sheet has been expanded, nd means for momentarily increasing the wi h of one step of the feed of the sheet at predetermined intervals in the operation of the slitting, stretching and expanding means, whereby alternate bands of expanded and of unexpanded metal extending the length of the sheet are produced in succession.

In testimony that we claim the foregoing as our invention we affix our signatures in the presence of two witnesses, this 17th day of January, 1923.

JAMES H. DEAN.
TORRIS H. ALFREDS.

Witnesses:
N. B. SULLIVAN,
CLARENCE E. MEHLHOPE.